(12) United States Patent
Bellardie et al.

(10) Patent No.: US 8,868,742 B2
(45) Date of Patent: Oct. 21, 2014

(54) METHOD FOR COMMUNICATION BETWEEN A TERMINAL AND A SERVER

(75) Inventors: Nicolas Bellardie, Puteaux (FR); Julien Grange, Paris (FR); Idy Watt, Issy les Moulineaux (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 12/667,058

(22) PCT Filed: Jun. 27, 2008

(86) PCT No.: PCT/FR2008/051178
§ 371 (c)(1),
(2), (4) Date: Dec. 29, 2009

(87) PCT Pub. No.: WO2009/007611
PCT Pub. Date: Jan. 15, 2009

(65) Prior Publication Data
US 2010/0179985 A1    Jul. 15, 2010

(30) Foreign Application Priority Data
Jul. 2, 2007  (FR) .................................... 07 56211

(51) Int. Cl.
*G06F 15/173* (2006.01)
*G06F 15/16* (2006.01)
(Continued)

(52) U.S. Cl.
CPC .............. *G01S 5/0054* (2013.01); *H04L 63/06* (2013.01); *H04L 63/126* (2013.01); *H04L 67/147* (2013.01); *H04W 4/20* (2013.01); *H04M 2250/10* (2013.01); *G06Q 20/14* (2013.01); *H04L 67/06* (2013.01); *H04L 63/10* (2013.01); *H04L 67/18* (2013.01); *G01S 19/03* (2013.01); *H04L 67/04* (2013.01); *H04M 1/72572* (2013.01); *H04W 4/02* (2013.01)
USPC ........... 709/225; 709/219; 455/456.2; 726/18

(58) Field of Classification Search
CPC ... H04L 63/0823; H04L 63/10; H04W 12/06; G06F 21/10; G06F 21/335; G06F 21/44
USPC ................. 709/203, 206, 227, 229, 219, 225; 455/414.3, 456.2; 726/18
See application file for complete search history.

(56) References Cited

U.S. PATENT DOCUMENTS 5,153,919 A * 10/1992 Reeds et al. ..................... 380/44
6,195,557 B1 * 2/2001 Havinis et al. ............. 455/456.2
(Continued)

FOREIGN PATENT DOCUMENTS

EP          1 530 315 A1    5/2005
WO    WO 2004/071127 A2    8/2004

OTHER PUBLICATIONS

International Search Report, dated Mar. 4, 2009, from corresponding PCT application.

*Primary Examiner* — Madhu Woolcock
(74) *Attorney, Agent, or Firm* — Knobbe Martens Olson & Bear LLP (57) ABSTRACT

The invention relates to a method for the communication of a terminal (10) with a server (14), the terminal including an application and computer software capable of communicating with the server (14). The method comprises: the step of sending (42) a request (RLoc) by the application (26) to the software (34), and the step of obtaining (44) by the software (34) and from the application (26) data (DAutor) necessary for the software (34) to communicate with the server (14) so that the request can be executed. This method enables access to GPS assistance servers to be limited only to users who have paid the localization service to the owner operator of the localization assistance server.

11 Claims, 2 Drawing Sheets

(51) Int. Cl.
*H04W 24/00* (2009.01)
*G01S 5/00* (2006.01)
*H04L 29/08* (2006.01)
*H04W 4/20* (2009.01)
*G01S 19/03* (2010.01)
*H04M 1/725* (2006.01)
*H04W 4/02* (2009.01)
*H04L 29/06* (2006.01)
*G06Q 20/14* (2012.01)

(56) References Cited

U.S. PATENT DOCUMENTS

| | | | | |
|---|---|---|---|---|
| 6,212,561 | B1 * | 4/2001 | Sitaraman et al. | 709/225 |
| 6,253,325 | B1 * | 6/2001 | Steele et al. | 726/5 |
| 6,285,869 | B1 * | 9/2001 | Shannon et al. | 455/411 |
| 6,466,571 | B1 * | 10/2002 | Dynarski et al. | 370/352 |
| 6,466,971 | B1 * | 10/2002 | Humpleman et al. | 709/220 |
| 6,594,483 | B2 * | 7/2003 | Nykanen et al. | 455/411 |
| 6,628,965 | B1 * | 9/2003 | LaRosa et al. | 455/557 |
| 6,978,023 | B2 * | 12/2005 | Dacosta | 380/258 |
| 7,203,480 | B2 * | 4/2007 | Jeon | 455/411 |
| 7,203,752 | B2 * | 4/2007 | Rice et al. | 709/225 |
| 7,441,016 | B2 * | 10/2008 | Gailey et al. | 709/219 |
| 7,506,214 | B2 * | 3/2009 | Anglin et al. | 714/43 |
| 7,522,579 | B1 * | 4/2009 | Mangal et al. | 370/352 |
| 7,558,585 | B2 * | 7/2009 | Laiho et al. | 455/456.5 |
| 7,565,547 | B2 * | 7/2009 | Matta et al. | 713/182 |
| 7,805,755 | B2 * | 9/2010 | Brown et al. | 726/10 |
| 7,823,192 | B1 * | 10/2010 | Fultz et al. | 726/7 |
| 8,023,958 | B2 * | 9/2011 | Wang et al. | 455/456.1 |
| 8,151,332 | B2 * | 4/2012 | Cross et al. | 726/7 |
| 2002/0157089 | A1 * | 10/2002 | Patel et al. | 717/178 |
| 2003/0023726 | A1 * | 1/2003 | Rice et al. | 709/225 |
| 2003/0035544 | A1 * | 2/2003 | Herle et al. | 380/270 |
| 2004/0204080 | A1 * | 10/2004 | Hayduk | 455/557 |
| 2004/0224702 | A1 | 11/2004 | Chaskar | |
| 2005/0066044 | A1 * | 3/2005 | Chaskar et al. | 709/230 |
| 2005/0078652 | A1 * | 4/2005 | Rousseau et al. | 370/349 |
| 2005/0114694 | A1 * | 5/2005 | Wager et al. | 713/200 |
| 2005/0192877 | A1 * | 9/2005 | Smith et al. | 705/34 |
| 2005/0266857 | A1 * | 12/2005 | Poikela | 455/456.3 |
| 2006/0036553 | A1 * | 2/2006 | Gupta et al. | 705/52 |
| 2006/0089126 | A1 | 4/2006 | Frank et al. | |
| 2007/0234404 | A1 * | 10/2007 | Bogdanovic et al. | 726/3 |
| 2007/0258623 | A1 * | 11/2007 | McGrath et al. | 382/104 |
| 2008/0004952 | A1 * | 1/2008 | Koli | 705/14 |
| 2012/0041878 | A1 * | 2/2012 | Yim | 705/44 |

* cited by examiner

METHOD FOR COMMUNICATION BETWEEN A TERMINAL AND A SERVER

BACKGROUND OF THE INVENTION

The present invention concerns a method of communication of a terminal with a server.

There is already known in the prior art such a method in which the terminal, for example a mobile telephone, contains an application program, referred to hereinafter as an application, adapted to manage a particular service, for example a service based on the location of the telephone. The terminal also includes a computer program adapted to communicate with a server external to the terminal in order to exchange data with the server. The method can comprise a step of the application sending the server a request that can be executed by the program after communicating with the server, for example after receiving data sent by the server to the program. To this end, the program contains authorization data necessary for the program to be able to communicate with the server, for example in the form of an identifier of the server associated with a private encryption key, this data guaranteeing that the computer program is authorized to exchange information with the server. Thus any request sent by an application to the program can be executed by virtue of communication between the program and the server.

A difficulty is that any application can send a request to the program to execute the request with the aid of the server. In particular, an application other than that initially intended and managing a service competing with the aforementioned service can use the program to execute a request with the aid of the server. It follows from this that a competitor of an operator to which the server belongs can offer users an application providing a service competing with the service proposed by the operator using the resources of the operator at will and free of charge. Also, subscribers of the operator who have not subscribed to the application authorized to use the server can use the server at will and obtain free of charge the benefit of the advantages of using that server.

SUMMARY OF THE INVENTION

The invention provides a method of communication of a terminal with a server ensuring better control of access to data sent by the server.

To this end, the subject of the invention is a method of communication of a terminal with a server, the terminal comprising an application and a computer program, the program being adapted to communicate with the server, the method comprising:

a step of the application sending the program a request, and
a step of the program obtaining from the application data necessary for the program to communicate with the server and for the server to execute the request.

Thanks to this method, it is not the computer program that initially contains the data necessary for communicating with the server but the application, which will generally be an application managed by the same operator as that to which the assistance server belongs. Consequently, another application that is not authorized to obtain the benefit of the advantages of using the server and is managed by a competing operator or installed for the purposes of piracy will not be capable of supplying to the program the data necessary for communication with the server and will therefore not be able to obtain from the program data enabling execution of the request sent by the application to the program. Thus only the application authorized by the operator to communicate with the server will be able to do so.

It will be noted that the application will generally be a data processing task adapted to manage a service, for which it provides the logic, not only by sending requests to the program but also by interacting with a user, for example with a user of the terminal via an interface of the terminal, or by interacting with storage means of the terminal, such as a database, with other computer programs or with other external servers. On the other hand, the program used in the terminal to access the server is generally not directly accessible to the terminal user.

It will further be noted that the communication set up between the server and the program enables complete or partial execution of the request sent by the application to the program. In particular, that request can be executed thanks to communication between the server and the program and also thanks to other operations executed by the program.

Furthermore, the step of the program obtaining data from the application can be a step of the application supplying data to the program, for example in the form of a step in which the application sends this data to the program or a step of the application authorizing access to this data by the program, for example by restricting to the program alone access in read mode to the data stored by the application.

As explained hereinafter, the communication method of the invention is of particular benefit in the context of a method of locating a terminal using a location assistance server including communication of the terminal with the server of the invention, and in particular in the context of a satellite-based location method.

To facilitate satellite location of a terminal, for example using GPS, there is already known in the art a method using a location assistance server, for example the assisted-GPS (A-GPS) or GPS+ method, in which the server supplies location assistance data to the terminal to be located, in particular a mobile telephone. For example, the mobile telephone includes an application for managing the location service which when activated by a user sends a location request to a program of the terminal. That program is capable of communicating with the external location assistance server, where appropriate via a telephone network having an Internet connection. To be more precise, the program sends an assistance request to the assistance server which is for example capable of estimating the approximate location of the terminal by means of the telephone network. Still by way of example, the assistance server is capable of determining which satellites are situated above the area in which the terminal to be located is liable to find itself (thanks to the pre-location of the terminal effected beforehand) and can therefore supply to the program of the terminal location assistance data indicating which signals sent by satellites are susceptible to provide it with its location. Thanks to this data, the terminal links to these satellites and can then quickly supply accurate location data to the application on the terminal that requested it.

It is generally required to limit access to assistance servers to only those users who have a contract for, and have therefore paid for, the location service of the operator that owns the assistance server. To this end, the prior art program contains data authorizing access to the location assistance data supplied by the assistance server, for example in the form of encryption keys, this data guaranteeing that the program is authorized to exchange information with the location assistance server. However, under these conditions, any application, in particular a competing application or a pirate application sending a location request to the program, is authorized to access the assistance server, thanks to the authorization data stored permanently in the program.

Thanks to the communication method of the invention, a location method is available using an assistance server providing improved control of access to the data sent by the assistance server. In this method it is not the computer program that initially contains the data necessary for communication with the assistance server but the location service management application, which will generally be an application managed by the operator that owns the assistance server. Consequently, an application other than the authorized application will not be able to provide the program with the data necessary for communication with the server and will therefore not be able to obtain location assistance data from the program. Thus only an application authorized by the operator to access the assistance data will be able to do so.

It will be noted that the location method can be used for any type of location, in particular for satellite location, such as location by the Global Navigation Satellite System (GNSS), combining location with the aid of GPS or Galileo satellites (when the latter become operational), or any other type of satellite location. It will further be noted that the location method can be used both to locate the terminal on a one-off basis at a given time and to locate it in real time during a certain time interval, i.e. as a navigation method. Furthermore, the method can locate a terminal provided with means for receiving a signal sent by a satellite and means for communicating with a location assistance server, these communication means using a mobile telephone network for example, such as a GPRS, EDGE, UMTS, etc. network, where appropriate providing access to the assistance server. This terminal will be a mobile telephone or a navigation terminal, for example.

A variant of the method includes a step of the program communicating with a position calculation module in the means for receiving a signal sent by a satellite. Accordingly, the aforementioned program is able to communicate at the same time with the server, such as the location assistance server, with the application and with means adapted to receive a signal sent by a satellite, such as a GPS signal receiver. The program is able to use data provided by the server, for example location assistance data, to send it to the position calculation module (comprising a "chipset" of integrated circuits) in the receiving means, or to use the data to control this calculation module or to calculate corrections to be made to calculations effected by that module.

This communication between the computer program and the position calculation module can be indirect, the program being executed in memory by a microprocessor of the terminal, for example, and communicating with the module (which is in software form) using the software of the microprocessor. Alternatively, the program can communicate (via hardware) directly with the position module in the receiving means by virtue of being implemented directly in the calculation module, that module being separate from the microprocessor of the terminal, which has the advantage of allowing fast execution of the program because these means can be configured to execute specific operations. It will moreover be noted that this position calculation module, with which the program communicates, can also be used for satellite location without necessarily using a location assistance server. In this case, the module can calculate the position of the terminal anyway, without the assistance data, although this generates a location of lower quality that is obtained with a much longer delay than if assistance data had been used. Thus using the location assistance server to locate the terminal can be optional.

In one variant of the method, the data ($D_{Autor}$) obtained during the step of obtaining data is deleted from the program after its transmission to the server. It can be deleted when the program receives the data resulting from execution of the request by the server, for example. In concrete terms, the data obtained being referred to as authorization data, the method includes a step of the program receiving from the server assistance data for executing the request followed by a step of deleting authorization data in the program. Accordingly, once the authorization data has been used to exchange information with the server, for example so that the computer program receives the location assistance data, the authorization data is deleted from the program, for example by eliminating it from a buffer memory of the program, so that the latter cannot consult the assistance server without again receiving the data authorized by the application. It will be noted that this step of deleting authorization data can optionally be executed directly after the step of receiving the assistance data.

In another variant, the method includes a step of the program sending the application other data, for example location data, followed by a step of warning that an action is being or has been effected, with a view to billing it. For example, the application receives in response to its request for location of the terminal location data obtained in particular at the end of communication between the program and the server. The reception of this location data reflects the fact that a service, for example a location assistance service, has been rendered, and the warning step enables the operator to bill later for the service rendered. This warning step can take the form, for example, of a connection between a billing server situated in the operator network and a map server communicating with the application to enable in particular downloading of geographical maps to the terminal. Accordingly, each time that the terminal downloads a map, the warning step includes setting up a connection between the cartography server and the billing server. The warning step could take many other forms. For example, the application could be connected directly to a billing server after receiving a geographical map or after the program receives location data or the application could store the number of location operations effected and transmit them periodically to an external server.

Another alternative is for the data obtained from the application by the program, referred to as authorization data, to comprise at least one of the elements of the group consisting of an identifier of the server, for example the IP address or the domain name of the server, and an encryption key shared at least by the application and the server, which key can be generated in accordance with the TLS (Transport Layer Security), GBA (Generic Bootstrapping Architecture) or PSK (PreShared Key) communication protocol. It will nevertheless be understood that these examples of authorization data are not limiting on the invention.

The invention is also concerned with a computer program comprising code instructions which execute the following steps when the program is executed by a processor:
  a step of receiving a request;
  a step of obtaining data necessary to communicate with a server and for the server to execute the request.

The invention also relates to an application comprising code instructions which execute the following steps when it is executed by a processor:
  a step of sending a request to a program;
  a step of providing data necessary for communication between the program and a server.

The invention is furthermore concerned with a communication terminal adapted to communicate with a server, the terminal comprising an application and a program:

the application being adapted to send a request to the program, the computer program being adapted to obtain from the application data necessary for the program to communicate with the server to enable execution of the request.

In the case of a communication terminal adapted to be located with the aid of a satellite location assistance server, in order to enable location assistance to be provided the application is adapted to send the program a request for location of the terminal and the program is adapted to obtain from the application data necessary for the program to be able to communicate with the server.

The invention is additionally concerned with a system comprising the above terminal and the location assistance server.

Moreover, the invention provides a storage medium storing the computer program and/or the application defined above and making the computer program and/or the application defined above available with a view to downloading them.

BRIEF DESCRIPTION OF THE DRAWINGS

The invention will be better understood on reading the following description, which is given by way of example only and with reference to the drawings, in which.

DESCRIPTION OF PREFERRED EMBODIMENTS

Figure 1:
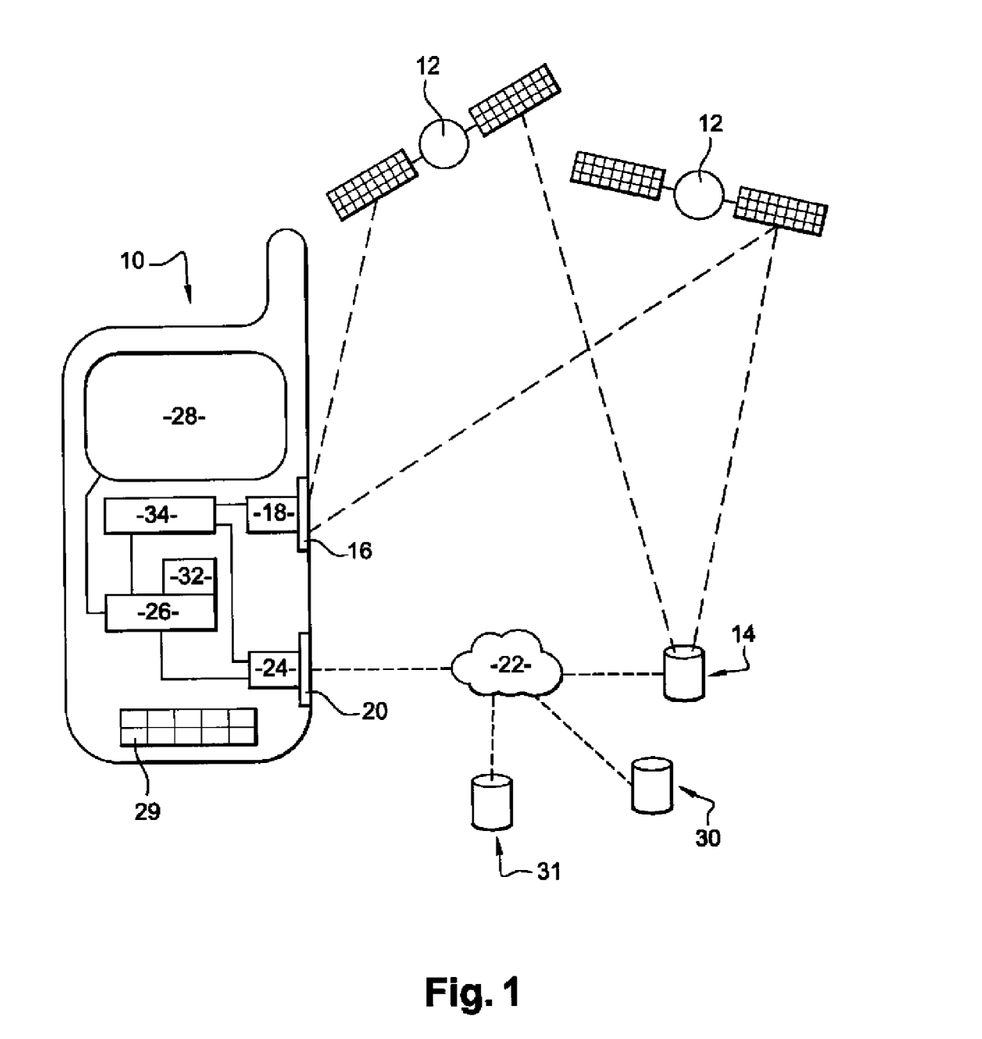
FIG. 1 is a diagrammatic view showing a communication system including a terminal of one embodiment of the invention.

FIG. 1 shows a communication terminal 10 adapted to communicate with a server 14. To be more precise, in this example the terminal 10 is adapted to be located by means of satellites 12 and the server 14 is a (terrestrial) satellite location assistance server assisting with locating the terminal 10. The terminal 10 is a mobile telephone, for example, or a navigation terminal such as those that can be used in an automobile vehicle.

The terminal 10 includes means 16, 18 for receiving signals sent by satellites comprising an antenna 16 associated with a position calculation module 18 in the receiving means and comprising one or more integrated circuits, referred to as a "chipset", separate from the microprocessor of the terminal 10 and capable of processing the signal received by the antenna 16 to produce therefrom data that can be processed by the microprocessor.

The terminal 10 further includes means 20, 24 for communicating with a communication network 22, this network 22 being in this example a mobile telephone network, such as a GPRS, EDGE or UMTS network, in particular one using the Internet. The communication means comprise an antenna 20 associated with means 24 for receiving a signal transmitted by the antenna 20.

It will be clear that the receiving means 16, 18, 20, 24 described are merely examples. In particular, they do not necessarily comprise an antenna or the antennas 16, 20 could be combined.

The terminal 10 further includes a service management application 26 which in this example manages a location service for locating the terminal 10. This application is implemented in the microprocessor of the terminal 10 which is associated with storage means such as a memory 32.

The application 26 is capable of interacting with various tools for providing the location service, for example with means for interfacing with a user of the terminal 10 comprising a display screen 28 and an input keyboard 29. It is also capable of interacting with an external cartographic server 30 from which the application 26 can download geographical maps via the network 22 in order to display them on the screen 28. The application 26 is also capable of receiving location data, in particular from the receiving means 16 (see below), and can where appropriate communicate via the network 22 with a billing server 31.

The application 26 could interact with other tools to provide the service, for example a database of the terminal 10, with other computer programs or with other external servers.

In one variant, the application 26 is capable of interacting with means for interfacing with a user of a terminal other than the terminal 10, for example with an adult having a terminal and attempting to locate a child having a terminal similar to the terminal 10 (but not necessarily including interface means) by seeking to interrogate the application 26 to locate the terminal 10.

The application 26 is moreover adapted to communicate with a computer program 34, in particular to send it a request to locate the terminal 10. The application 26 is furthermore capable of supplying to the program 34 data referred to as authorization data necessary for the program 34 to be able to communicate with the assistance server 14 via the network 22 in order to enable location assistance to be provided.

In addition to its ability to communicate with the application 26 and with the assistance server 14, the computer program 34 is capable of communicating with the means 18 for receiving a satellite signal.

In one embodiment this computer program 34 is implemented in the microprocessor of the terminal 10. In another embodiment the computer program 34 is implemented in the receiving means, to be more precise in the calculation module 18, separate from the microprocessor of the terminal. In this case where the program 34 is implemented directly in the module 18 without being executed by the microprocessor, it can be configured to execute specific operations, execution of which will be particularly fast.

It will be noted that the memory 32 associated with the application 26 is capable of storing data $D_{Autor}$, referred to as authorization data, necessary for the program 34 to be able to communicate with the server 14 to enable location assistance to be provided. To be more precise, this authorization data includes here an IP address or a domain name of the server 14 and an encryption private key making control of access to the server 14 highly secure, this key being shared by the application 26 and the server 14. This data $D_{Autor}$ can take a multiplicity of other forms, however, and in particular does not necessarily comprise an encryption key, an IP address or a domain name.

Figure 2:
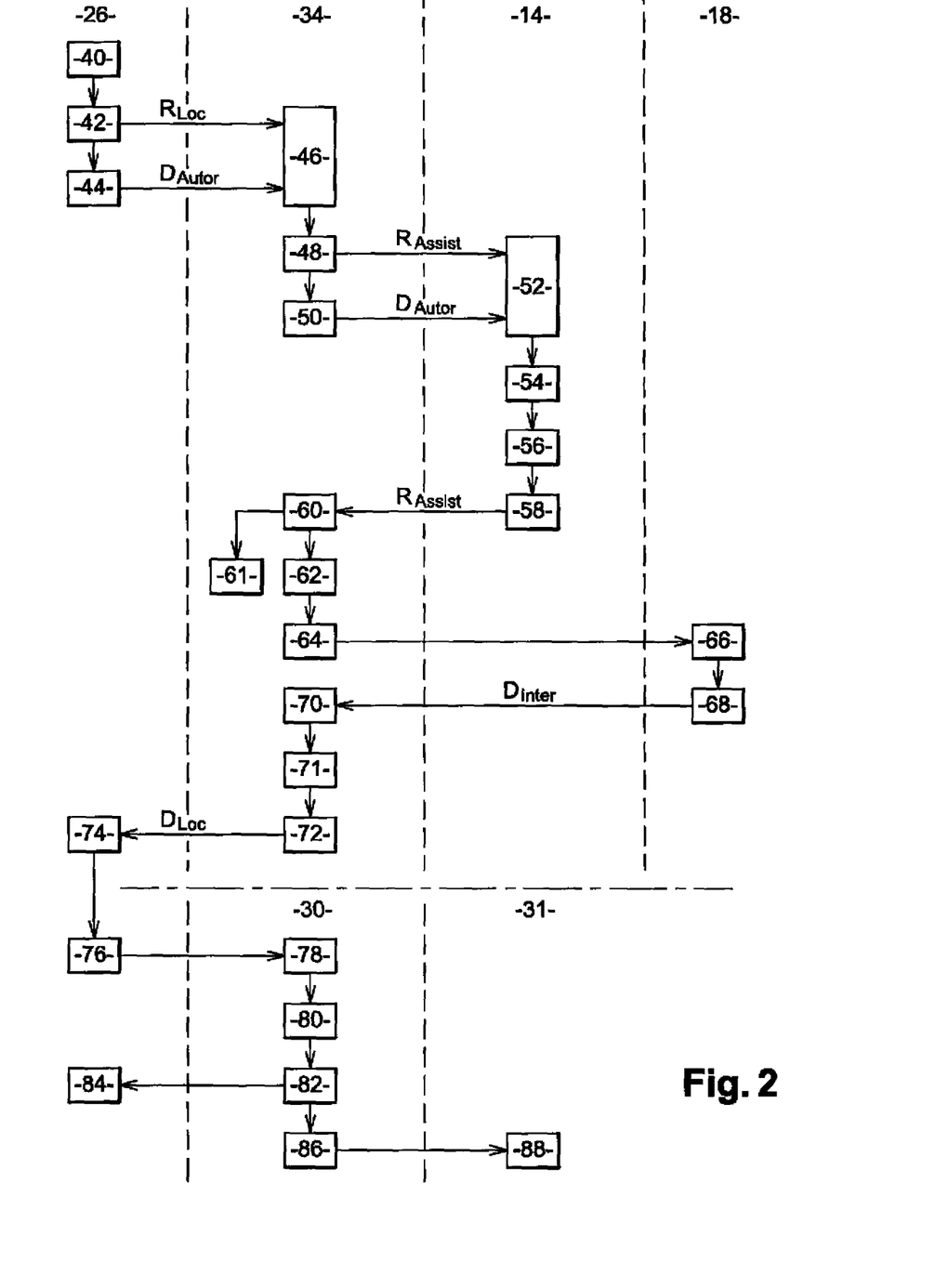
FIG. 2 is a diagram showing a method of communication between the terminal and the server from FIG. 1.

A communication method, here a location method, implemented by the terminal 10 from FIG. 1 is described next with reference to FIG. 2.

The method begins with a step 40 of requesting location of the terminal 10, which request is received by the application 26 with which the user of the terminal 10 interacts by means of the keyboard 29 and the screen 28 of the terminal. This step 40 is followed by a step 42 of the application 26 sending the computer program 34 a location request $R_{Loc}$, this step being followed by a step 44 of the application 26 providing the program 34 with the data $D_{Autor}$ necessary for the program 34 to communicate with the server 14 to enable location assistance to be provided. Alternatively, the steps 42 and 44 can be simultaneous.

The steps 42 and 44 are followed by a step 46 of the program 34 receiving the request $R_{Loc}$ to locate the terminal and the authorization data $D_{Autor}$, the request $R_{Loc}$ being received before, after or at the same time as the data $D_{Autor}$. The step 46 is followed by a step 48 of the program 34 sending the server 14 a request $R_{Assist}$ to assist with location of the terminal 10 and a step 50 of the program 34 providing the server 14 with the data $D_{Autor}$ previously received. These steps 48, 50, which occur one before or after the other or simultaneously, are followed by a step 52 of the server 14 receiving the assistance request $R_{Assist}$ and the authorization data $D_{Autor}$. The reception step 52 is followed by a step 54 of verification by the server 14 of the authorization data $D_{Autor}$ during which the server 14, which knows for example the encryption private key used by the application 26 to generate the data $D_{Autor}$, verifies that this data $D_{Autor}$ was generated using that private key.

It will be noted that the steps 48 to 54 aiming to set up efficient communication between the program 34 and the server 14 to enable exchange of data between the server and the program can take other forms. In particular, the method does not systematically include a step of the program 34 sending the server 14 data $D_{Autor}$ obtained beforehand and can include a step of establishing access between the program and the server. This can be the case if the data $D_{Autor}$ comprises only an IP address of the server 14, this address being necessary to set up the connection but not being sent to the server. Moreover, the encryption algorithms can include keys that are not sent but enable communication to be encrypted/decrypted.

When the verification step 54 has a positive result or a connection has been set up there follows a step 56 of approximate or coarse location by the server 14 of the terminal 10, this coarse location being effected by means of the network 22, here a mobile telephone network, which is capable of locating an area in which the terminal 10 is situated. The step 56 is followed by a step 58 of the server 14 sending assistance data $D_{Assist}$ to the program 34, this data $D_{Assist}$ including information as a function of the approximate location obtained following the step 56, for example an identification of the satellites 12 situated above the terminal 10 and the signals from which are likely to enable fast and efficient location of the terminal 10, or correction data relating to the environment in which the terminal 10 is situated, in order thereafter to enable accurate location. This data $D_{Assist}$ can take other forms. For example, the server 14 could send the program 34 only the coordinates of the coarse location area of the terminal 10, the program 34 then proceeding to perform the calculations itself.

The step 60 of the program 34 receiving the data $D_{Assist}$ is followed by a step 61 of deleting the data $D_{Autor}$ from the buffer memory of the program 34 and a step 62 of the program 34 processing this data, followed by a step of sending the receiving means 16, 18 instructions enabling accurate measurements to be effected in order to obtain an exact location of the terminal 10 faster and more accurately than the server 14. This step 64 is followed by a step 66 of the means 16, 18 executing the instructions sent by the terminal 34, in particular by effecting measurements, and then a step 68 of sending the program 34 intermediate location data $D_{Inter}$ in respect of the terminal 10 obtained from the measurements, this data $D_{Inter}$ thereafter enabling provision of accurate location data.

The sending step 68 is followed by a step 70 of the program 34 receiving the data $D_{Inter}$ and then a step 71 of processing this data $D_{Inter}$ during which calculations are carried out, for example to correct the data $D_{Inter}$ measured by the receiving means as a function of the data $D_{Assist}$ provided to the program during the step 60. This step 71 could also include a step of exchanging the measurements with the server 14 with a view to correcting them (in this case, the deletion step 61 is executed after the step 71). The step 71 is followed by a step 72 of sending the application 26 the location data $D_{Loc}$.

The step 74 of the application 26 receiving the data $D_{Loc}$ is followed in this example of the method by a step 76 of the application 26 requesting downloading from the network 22 of a geographical map corresponding to the location provided by the data $D_{Loc}$. The step 76 is followed by a step 78 of the cartography server 30 receiving the request and then a step 80 of the server 30 looking for an associated map, followed by a step 82 of sending that map to the application 26 and a step 84 of the application 26 displaying on the screen 28 the map associated with the location of the terminal 10. The sending step 82 is moreover followed by a step 86 of the server 30 warning the billing server 31 via the network that a location has been effected, which step is subsequently followed by a step 88 of the server 31 billing for the service provided.

It will be noted that the program 34 or the application 26 can be stored on a storage medium, for example a CD or a DVD, before they are installed in the terminal 10, for example. The program 34 or the application 26 can equally be made available for downloading, in particular via the Internet.

It will finally be noted that the invention is not limited to the embodiments described above.

In particular, the exchanges between the program 34 and the server 14 can take place upstream of the measurements effected by the means 16, 18, in order to effect accurate measurements, and/or downstream of the measurements, in order to correct the measurements.

Moreover, the step 44 of the program 34 obtaining the data $D_{Autor}$ from the application 26 can take forms other than the application 26 sending this data. The memory 32 being a memory (possibly external to the application 26) in which the application can write and access to which in read mode is restricted to the program 34 can be envisaged. In this case, the program can obtain the data $D_{Autor}$ by reading this data in the memory 32. Thus a competing or pirate application could not obtain this data $D_{Autor}$ because it is not authorized to read it.

Furthermore, the steps up to step 88 can be replaced by other steps. It will be noted that in one particular variant of the invention the terminal 10 is placed on a child and the application 26 interacts during the location process not with the interface of the terminal 10 but with an external server to provide it with the data $D_{Loc}$ on the location of the child, a mother being able also to communicate with the server to discover that location.

It will be clear that as the program 34 does not initially include the data enabling communication with the assistance server 14, if an application other than the application 26 and that is not authorized is downloaded into the terminal 10 it could not communicate with the server 14 to locate the terminal. That other application could possibly obtain location data from the receiving means 68, for example GPS data, but without the prior assistance of the server 14, i.e. without A-GPS, with the result that this data would be less accurate and obtained more slowly.

The invention claimed is:

1. A method of communication between a terminal and a location assistance server of an operator, the terminal comprising an authorized application and a computer program, the method comprising:

sending of a first request to determine a geographical location of the terminal from the authorized application, said authorized application configured to manage a location service activated by interaction with a user of the terminal, to the computer program, said computer program configured to communicate with the location assistance server external to the terminal, wherein the computer program is not directly accessible to the user of the terminal; and the authorized application providing the computer program with authorization data comprising an identifier of the location assistance server necessary to authorize the computer program to communicate with the location assistance server which estimates an approximate location of the terminal as location assistance data, wherein the location service is associated with the location assistance server and wherein the computer program is not part of the authorized application, the authorized application initially containing the authorization data stored in a memory associated with the authorized application and the computer program not initially having access to the authorization data;

the computer program sending a second request to the location assistance server, via a network, based on the authorization data and the first request received by the computer program from the authorized application, the computer program providing the location assistance server with the authorization data received from the authorized application, wherein only the authorized application initially containing the authorization data communicates with the location assistance server through the computer program, and in response to the location assistance server verifying the authorization data and executing the second request, the computer program receiving the location assistance data from the location assistance server;

the computer program using the received location assistance data for executing the first request by calculating the geographical location of the terminal, which is more accurate than the location assistance data; and sending, by the computer program, the calculated geographical location of the terminal to the authorized application in order for the authorized application to use the calculated geographical location of the terminal.

2. The method according to claim 1, wherein the authorization data is deleted from the computer program after the authorization data is provided to the location assistance server.

3. The method of claim 1, wherein the terminal is one of a mobile telephone or a navigation terminal for an automobile vehicle.

4. A non-transitory computer readable storage medium storing a computer program and an authorized application on a terminal, comprising:

the computer program, when executed by a processor of the terminal, configured to execute:

receiving a first request from the authorized application to determine a geographical location of the terminal, wherein the computer program is configured to communicate with a location assistance server external to the terminal, and wherein the computer program is not directly accessible to a user of the terminal; and obtaining, from the authorized application in the terminal, authorization data comprising an identifier of the location assistance server necessary to authorize communication with the location assistance server which estimates an approximate location of the terminal as location assistance data, wherein the computer program is not part of the authorized application and the computer program does not initially have access to the authorization data;

sending a second request to the location assistance server, via a network, based on the authorization data and the first request received from the authorized application, providing the location assistance server with the authorization data previously received from the authorized application, wherein only the authorized application initially containing the authorization data communicates with the location assistance server through the computer program;

in response to the location assistance server verifying the authorization data and executing the second request, receiving the location assistance data from the location assistance server;

using the received location assistance data for executing the first request by calculating the geographical location of the terminal, which is more accurate than the location assistance data; and sending the calculated geographical location of the terminal to the authorized application;

and further comprising:

the authorization application, when executed by the processor of the terminal, configured to execute:

sending the first request to the computer program, wherein the authorized application is configured to manage a location service activated by interaction with the user of the terminal, wherein the location service is associated with the location assistance server;

providing the computer program with the authorization data, wherein the authorized application initially contains the authorization data stored in a memory associated with the authorized application; and receiving the calculated geographical location of the terminal from the computer program in order to use the calculated geographical location of the terminal.

5. The non-transitory computer readable storage medium of claim 4, wherein the computer program is further configured to execute, when executed by the processor of the terminal:

deleting the authorization data from the computer program after the authorization data is provided to the location assistance server.

6. The non-transitory computer readable storage medium of claim 4, wherein the computer program is adapted to be downloaded from the non-transitory computer readable storage medium.

7. The non-transitory computer readable storage medium of claim 4, wherein the authorized application is adapted to be downloaded from the non-transitory computer readable storage medium.

8. The non-transitory computer readable storage medium of claim 4, wherein said non-transitory computer readable storage medium is in the terminal selected from the group consisting of a mobile telephone and a navigation terminal for an automobile vehicle.

9. A communication terminal configured to communicate with a location assistance server of an operator, the communication terminal comprising:

a processor and a non-transitory computer readable storage medium and being configured to execute an authorized application and a computer program stored in the non-transitory computer readable storage medium, wherein:

the computer program is not part of the authorized application, the authorized application manages a location service activated by interaction with a user of the communication terminal, wherein the location service is associated with the location assistance server, the authorized application is configured to send a first request to determine a geographical location of the communication terminal to the computer program, said computer program configured to communicate with the location assistance server external to the communication terminal, wherein the computer program is not directly accessible to the user of the communication terminal, the authorized application is configured to provide to the computer program with authorization data comprising an identifier of the location assistance server necessary to authorize the computer program to communicate with the location assistance server which estimates an approximate location of the communication terminal as location assistance data, wherein the authorized application initially contains the authorization data stored in a memory associated with the authorized application and the computer program does not initially have access to the authorization data;

the computer program is configured to send a second request to the location assistance server, via a network, based on the authorization data and the first request received by the computer program from the authorized application, the computer program is configured to provide the location assistance server with the authorization data previously received from the authorized application, wherein only the authorized application initially containing the authorization data is configured to communicate with the location assistance server through the computer program;

in response to the location assistance server verifying the authorization data and executing the second request, the computer program is further configured to receive the location assistance data from the location assistance server;

the computer program is configured to use the received location assistance data for executing the first request by calculating the geographical location of the communication terminal, which is more accurate than the location assistance data; and the computer program is configured to send the calculated geographical location of the communication terminal to the authorized application in order for the authorized application to use the calculated geographical location of the communication terminal.

10. The communication terminal of claim 9, wherein the computer program is configured to delete the authorization data from the computer program after the authorization data is provided to the location assistance server.

11. The communication terminal of claim 9, wherein the communication terminal is one of a mobile telephone or a navigation terminal for an automobile vehicle.

* * * * *

UNITED STATES PATENT AND TRADEMARK OFFICE
CERTIFICATE OF CORRECTION

PATENT NO. : 8,868,742 B2
APPLICATION NO. : 12/667058
DATED : October 21, 2014
INVENTOR(S) : Bellardie et al.

It is certified that error appears in the above-identified patent and that said Letters Patent is hereby corrected as shown below:

In the Specification

Column 7 line 53, After "step" insert --64--.

Column 8 line 17, After "network" insert --22--.

In the Claims

Column 11 line 8, Claim 9, after "provide" delete "to".

Signed and Sealed this
Second Day of June, 2015

Michelle K. Lee
*Director of the United States Patent and Trademark Office*